July 15, 1947.  R. B. DOME  2,424,079
SYSTEM OF COMMUNICATION
Filed April 19, 1943   2 Sheets-Sheet 1
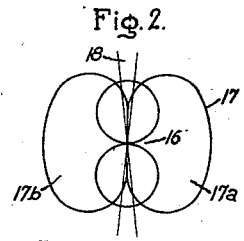
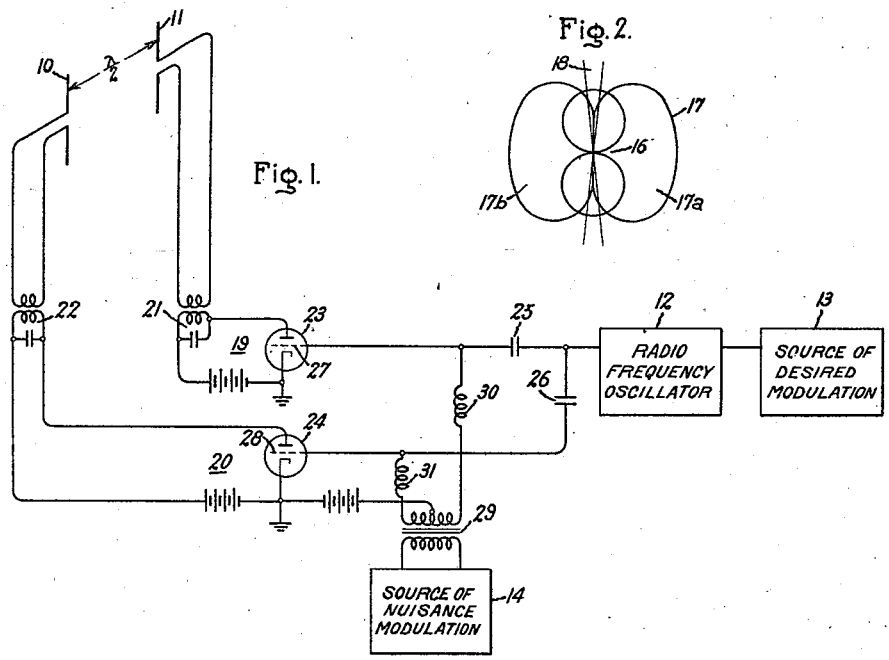
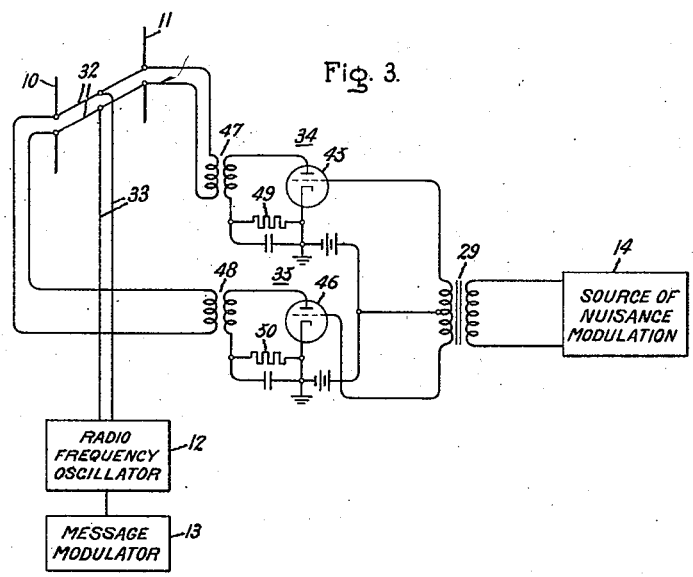
Inventor:
Robert B. Dome,
by Harry E. Dunham
His Attorney.

July 15, 1947.   R. B. DOME   2,424,079
SYSTEM OF COMMUNICATION
Filed April 19, 1943   2 Sheets-Sheet 2
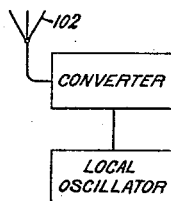
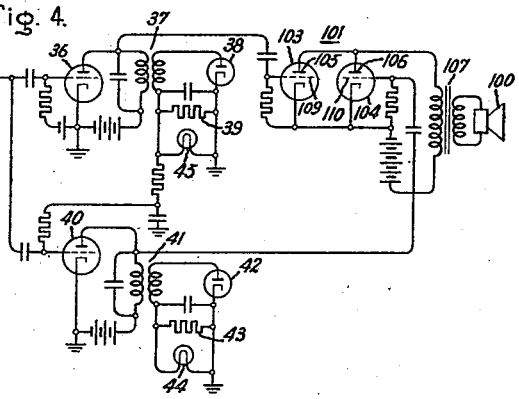
Fig. 4.
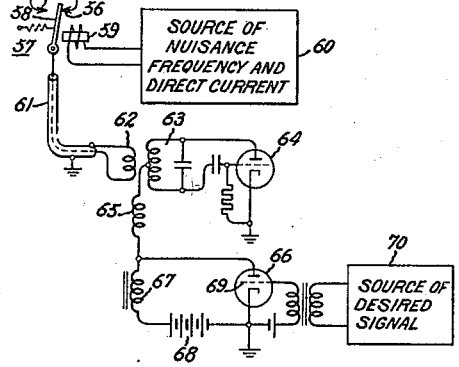
Fig. 5.
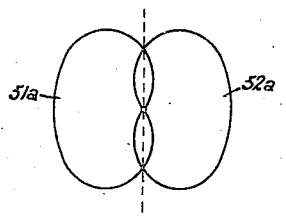
Fig. 6.
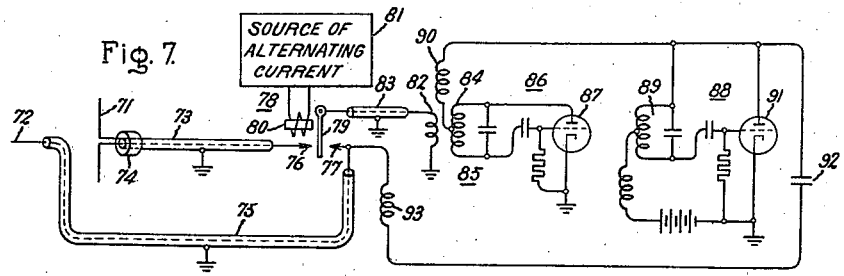
Fig. 7.
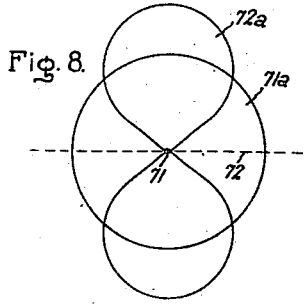
Fig. 8.
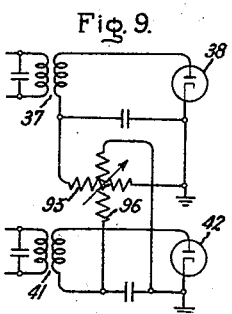
Fig. 9.
Inventor:
Robert B. Dome,
by Harry E. Dunham
His Attorney.

Patented July 15, 1947

2,424,079

UNITED STATES PATENT OFFICE 2,424,079

SYSTEM OF COMMUNICATION

Robert B. Dome, Bridgeport, Conn., assignor to General Electric Company, a corporation of New York Application April 19, 1943, Serial No. 483,600

9 Claims. (Cl. 250—11)

My invention relates to direction determining systems.

Direction determining systems are in use at the present time in which a signal is transmitted on a relatively narrow beam. Such systems are used by airlines, for example, to enable an aircraft to fly blind along a predetermined path. It is an object of my invention to provide a new and improved system of this type.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Figs. 1, 3, 5 and 7 show, schematically, different arrangements for transmitting beamed signals; Figs. 2, 6 and 8 show field radiation patterns for the systems of Figs. 1, 5 and 7, respectively; and Figs. 4 and 9 illustrate receiving and indicating means for signals transmitted in accordance with my invention.

Referring to Fig. 1 of the drawing, there are shown vertical antennas 10 and 11 such as dipoles, for example, substantially one-half wavelength long and spaced apart one-half wavelength of the wave at which the system operates. Antennas of the type shown have substantially circular field strength patterns. In accordance with my invention, high frequency oscillations or carrier waves from oscillator 12, modulated according to a desired signal from a suitable source 13, are supplied in phase to both antennas by means of suitable transmission lines.

Means is provided for masking or blanketing the desired signals, or for interfering therewith, in all directions except those within a relatively narrow beam. For this purpose, there is also supplied to the antennas 10 and 11 in opposite phase relationship a masking or nuisance signal from a suitable source of masking or nuisance signal 14.

For example, the excitation on one antenna may be represented by the formula $$E_1 = E_0 \cos \omega t \, (1 + m \cos at)(1 + n \cos bt)$$

and on the other antenna by $$E_2 = E_0 \cos \omega t \, (1 + m \cos at)(1 - n \cos bt)$$

where $E_1$ and $E_2$ = instantaneous values of voltage
$E_0$ = maximum value of voltage
$\omega = 2\pi f$
$f$ = carrier frequency
$a = 2\pi A$ where (A is the desired message frequency)
$b = 2\pi B$ where (B is the nuisance or masking frequency)
$m$ and $n$ = constants which may be termed "factors of modulation" and represent the degree of modulation.

Along a line normal to the plane of the antennas 10 and 11 at a point equidistant therebetween, no nuisance signal will be detected at any substantial distance from the antennas because of mutual cancellation. In this direction, only the desired signal will be heard, but at any other angle both signals will be heard if the energies corresponding to the two signals are about equal. If the energy corresponding to the nuisance signal is substantially greater than that corresponding to the desired signal, only the nuisance signal will be heard except along the desired beam.

The above considerations are illustrated in Fig. 2. The field pattern of the desired signal is figure eight in shape, as indicated by the numeral 16. The field pattern of the nuisance signal is represented by the numeral 17 for a case in which the energy content of the nuisance signal is substantially greater than that of the desired signal, the signal strength in the lobes 17a and 17b varying sinusoidally and the excitation of one of the antennas due to the nuisance signal being maximum when the other is minimum and vice versa. In other words, the excitations of the antennas are rendered alternately maximum at the nuisance signal rates. The desired signal can be heard only by receivers on the beam 18.

Such an arrangement is useful for "beaming" of broadcasts in a desired direction as well as for direction finding.

In Fig. 1 there is shown means for applying the modulated signals to the antenna system including control electrode modulated amplifiers 19 and 20. The amplifiers comprise tuned circuits 21 and 22, respectively, and electron discharge devices 23 and 24, respectively. The carrier wave of high radio frequency oscillations, modulated by the desired signal, is applied to the control electrodes 27 and 28 of the devices 23 and 24 through suitable coupling condensers 25 and 26 respectively. The out-of-phase modulation of the nuisance signal is provided by applying a modulation voltage to the control electrodes 27 and 28 through a center tapped transformer 29, the center tap being connected to a suitable source of direct current potential and the opposite ends to the control electrodes. In order to keep radio frequency currents out of the modulator supply, suitable choke coils 30 and 31 are provided.

In Fig. 3 there is shown a different embodiment of my invention. The antennas 10 and 11 are interconnected at the midpoints thereof by a suitable impedance matching line 32. The carrier, modulated by the desired signal or message, is applied to the line 32 by means of a suitable transmission line 33. The out-of-phase nuisance signals from the source 14 are applied to antennas 10 and 11 through the transformer 29 and energy absorbing devices 34 and 35. The absorbing devices may include electron discharge devices 45 and 46 and transformers 47 and 48, one set of windings being connected between the anodes and cathodes of devices 45 and 46, respectively, through resistances 49 and 50, respectively. The other windings of the transformers 47 and 48 are connected to the antennas 11 and 10, respectively. When one of the devices 45 or 46 is conducting, energy from the antenna with which it is associated is absorbed in the associated resistor. Accordingly, energy radiated in directions other than the desired direction pulsates and maximizes alternately with respect to the two antennas.

At any receiving point, it may be desired to provide an indication whenever signals are being directed to that point or to otherwise apprise an operator of the operation of the transmitter. In Fig. 4 there is shown a circuit for accomplishing this purpose. After detection the nuisance signal may be amplified in an amplifier 36, including a tuned circuit 37 tuned to the nuisance frequency, and rectified in a rectifying device 38. The voltage drop across a resistor 39 in the rectifier discharge circuit may be used as a cutoff bias on the amplifier 40, tuned to the frequency of the desired signal, and thereby render inoperative that device.

With such an arrangement if the transmitted beam is aimed at the receiving antenna 102, substantially no nuisance signal is received and hence the amplifier 40 including a tuned circuit 41, tuned to the frequency of the desired signal, is operative because of the absence of cutoff bias across resistor 39. The output is rectified, as by a diode 42, and the voltage drop across resistor 43, connected in the rectifier discharge circuit, may be applied to a signal device, such as a lamp 44.

If it is desired to provide an indication at all receiving points whenever the transmitter is operating, a signal device such as a lamp 45 may be connected across the resistor 39. Thus when either lamp is lighted the transmitting means is in operation. When only lamp 44 is energized, the receiver is within the transmitted beam, but when only lamp 45 is energized, the receiving antenna is outside of the beam.

If audible reproduction of the signal is desired, reproducing means, such as a loudspeaker 100, may be connected to an audio frequency amplifier 101 which is connected across the tuned circuits 37 and 41. The illustrated amplifier comprises a pair of electron discharge devices 103 and 104 of the triode type. The anodes 105 and 106, respectively, are connected together and to one side of the primary winding of the output transformer 107. The control electrode 109 of the discharge device 103 is excited from the tuned circuit 37 by the nuisance frequency and the control electrode 110 of the electron discharge device 104 is excited from the tuned circuit 41 by the desired signal frequency. Because of the biasing action of the nuisance signal, the desired audio signal is heard only when the antenna 102 is on the beam.

In Fig. 5 there is shown a different arrangement for transmitting a signal substantially only along a predetermined line. The system comprises two antennas 51 and 52 spaced apart a quarter wavelength. Each is fed from its own transmission line section 53, 54, respectively, each of the sections being an odd multiple of a quarter wave in length. The central conductor of each line is connected to contacts 55 and 56, respectively, of a vibrator 57 having a centrally disposed movable arm 58. The movable arm may be actuated by a suitable electromagnet 59 or the like supplied from a suitable source of nuisance frequency 60. The source 60 preferably includes a polarizing direct current voltage. If desired, polarization may be obtained by employing a permanent magnet or by superposing a direct current voltage on an alternating current operating voltage. The same result is obtained by applying an alternating voltage of half the frequency employed when polarization is used. The arm 58 is conneced to a suitable source of modulated radio frequency energy, as by means of a transmission line 61 and pickup coil 62 coupled to the radio frequency oscillator tank circuit 63. The oscillator is supplied with modulated alternating current through a suitable radio frequency choke 65 from a suitable modulator tube or discharge device 66. The modulation reactor 67 and the anode supply 68 for the modulator 66 are connected as with conventional modulators. The control electrode 69 of the discharge device 66 is excited from a suitable source 70 of the desired signal.

The oscillator 64 generates a continuous radio frequency carrier wave modulated by the desired signal. The vibrator or switching means 57 switches the output from the oscillator to one antenna or the other at the rate of the nuisance frequency.

In Fig. 6, there is represented the field radiation patterns 51a and 52a of the antennas 51 and 52, respectively, when operated in the above manner. With antenna 51 energized, for example, the field pattern is represented by the cardioid 51a because the unenergized antenna 52 acts as a reflector for the antenna 51. Similarly, when antenna 52 is energized, the cardioid pattern 52a results. By separating the antennas a quarter wave, optimum results for reflection are obtained. The reason for making the transmission line sections 53 and 54 an odd multiple of a quarter wave is that an open line a quarter wavelength long looks like a short circuit at the other end so that the unfed antenna looks like a resonant closed antenna in tune.

In Fig. 6 the dashed line is normal to the plane of the antennas 51 and 52 and a receiver located substantially along this line will be equally excited no matter which antenna is energized because on this line the cardioids have equal strength. Accordingly, no nuisance modulation is received. However, in any other direction the cardioid patterns differ so that a receiver picks up more energy from one antenna than from the other and considerable nuisance frequency is present in the detector output. This nuisance frequency in the output may be used to disable the reproducing device so that no signal is reproduced, as hereinbefore described. Within the beam the disabling signal is not available, and hence the desired signal can go through to the reproducing device to apprize the operator that he is on the beam from the transmitter. Thus, the excitation of the antennas again maximizes alternately at the nuisance frequency. In this case, however, there is no sinusoidal variation as applied in connection with Fig. 1, the energization being alternately applied rather than alternately varied.

In Figs. 7 and 8 there is illustrated a different arrangement for enabling the operator at a receiving point to know whether or not a signal is being directed toward his station. This embodiment comprises dipoles 71 and 72, the dipoles 71 being fed through a transmission line 73 which is provided with a concentric, metal cylinder 74 of proper length to permit the transfer of energy from a single ended line to a balanced dipole. The antenna 72 is end fed or energized through a transmission line 75. The transmission lines 73 and 75 terminate on contacts 76 and 77, respectively, of the switching device or relay 78. The device 78 is similar to the device 57 in Fig. 5 and is provided with a movable arm 79 for engaging one or the other of the contacts. The movable arm may be set in motion mechanically or electrically as, for example, by an electromagnet 80 energized from a suitable source of alternating current 81. The arm 79 is connected to a coupling coil 82 by means of a suitable transmission line section 83. The coil 82 is coupled to the coil 84 of the tuned circuit 85 of a radio frequency oscillating circuit 86. The oscillator also comprises an electron discharge device 87 and is plate modulated by another lower frequency oscillator 88 having a tuned circuit 89. In order to prevent radio frequency currents from circulating in the oscillator 86 there is provided a suitable choke coil 90 connected between the coil 84 and the anode of the discharge device 91 in the oscillator 88.

It may here be noted that the transmission lines 73 and 75 may be of any length but it may be preferable to make line 73 a multiple of a half wave in length so that when the contact 76 is open, the antenna system 71 is anti-resonant.

I have provided means for causing the modulator frequency to be periodically shifted. For this purpose there is provided a condenser 92 connected between the anode of the discharge device 91 and the contact 77 so that the condenser 92 is connected in shunt with the tuned circuit 89 when the arm 79 is in contact with the contact point 77. A low frequency path from condenser 92 to ground is provided through a suitable choke coil 93, contact 77, the arm 79 and the transmission line section 83, the choke 93 preventing radio frequency currents from circulating in the modulator circuit 88.

With this arrangement, when the arm 79 engages the contact 76, antenna 71 is excited with radio frequency modulated at a desired frequency as, for example, 30 kc. and produces in space a substantially circular pattern, as indicated by numeral 71a in Fig. 8. When the arm 79 engages the contact 77, antenna 71 is no longer excited, but antenna 72 is excited with the same radio frequency energy but at a lower modulating frequency because of the addition of the condenser 92 to the circuit. For example, the capacitor 92 may be so chosen as to provide a modulation frequency of about 20 kc. The radiation pattern for the 20 kc. modulated signal is represented by the numeral 72a in Fig. 8. If the receiver is in line with the antenna 72, substantially no 20 kc. component will be received but 30 kc. signals will be detected because the antennas 71 and 72 are disposed at right angles to each other and antenna 72 has substantially no propagation in a direction in line with itself. Thus a receiver having a circuit responsive to 30 kc. will deliver energy to the reproducing device to apprize the operator that a signal is being intercepted. If the receiver is located outside of the beam, alternate bursts of 30 kc. and 20 kc. signals will be received. The 20 kc. signals may be amplified, detected, and used to bias off the 30 kc. amplifier so that the reproducing device will not respond. In this manner the operator at the receiver will know whether or not the transmitter is directing a signal to him for only if he is substantially in line with the antenna 72 will he get a positive response. In practice it may be desirable to delay slightly the bias due to the 20 kc. signal in order to provide for a beam of finite width as, for example, of the order of 3° width.

In Fig. 9 there is shown a modification of the indicating means illustrated in Fig. 4. The resistors 39 and 43 and indicating lamps 45 and 44 are replaced by windings or coils 95 and 96 of a ratio meter. If the receiving antenna system is "on the beam," the indicating arm will be parallel with coil 96. If the receiver antenna system is "off the beam," the arm will deviate from the correct position by an amount depending upon the distance away from the beam.

While I have shown and described a particular embodiment of my invention, it will be obvious to those skilled in the art that changes and modifications may be made without departing from my invention in its broader aspects, and I therefore aim in the appended claims to cover all such changes and modifications as fall within the true spirit and scope of my invention.

What I claim as new and desire to secure by Letters Patent of the United States is:

1. A radio communication system comprising transmitting means and receiving means including an antenna, said transmitting means comprising means for transmitting a desired signal, and means for transmitting a nuisance signal in all directions except substantially along a predetermined line, said receiving means comprising a first circuit tuned to the frequency of the desired signal, said receiving means also including a second circuit tuned to the frequency of the nuisance signal, means for impressing the received signals on said tuned circuits, means utilizing said second circuit for rendering inoperative said first circuit in the presence of any substantial nuisance signal whereby said first circuit is operative only when said receiving antenna is located substantially on said line.

2. A radio communication system comprising transmitting means and receiving means including an antenna, said transmitting means comprising means for transmitting a desired signal and means for transmitting a nuisance signal in all directions except substantially along a predetermined line, said receiving means comprising a first circuit tuned to the frequency of the desired signal, and a second circuit tuned to the frequency of the nuisance signal, means for impressing the received signals on said tuned circuits, and means utilizing the absence of a signal in said second circuit for apprising an operator of the presence of a signal directed toward said receiving antenna.

3. A radio communication system comprising transmitting means and receiving means including an antenna, said transmitting means comprising means for transmitting a desired signal and means for transmitting a nuisance signal in all directions except substantially along a predetermined line, said receiving means comprising a first circuit tuned to the frequency of the desired signal, and a second circuit tuned to the frequency of the nuisance signal, means for impressing the received signals on said tuned circuits, and means utilizing the presence of a signal in one of said circuits for apprising an operator of the transmission of signals from said transmitting means.

4. A radio communication system comprising transmitting means and receiving means including an antenna, said transmitting means comprising a pair of antennas operating on substantially the same carrier frequency, means for transmitting a desired signal, and means for transmitting a nuisance signal in all directions except substantially along a predetermined line, said receiving means comprising a first circuit tuned to the frequency of the desired signal, and a second circuit tuned to the frequency of the nuisance signal, means for impressing the received signals on said tuned circuits, and means associated with said tuned circuits whereby the desired signal is reproduced when the receiving antenna is located substantially on said line but any output from said second circuit is utilized to prevent the operation of said first circuit so that no signal will be reproduced when the receiving antenna is located substantially away from said line.

5. A radio communication system comprising transmitting means and receiving means, said transmitting means comprising a pair of antennas operating on substantially the same carrier frequency, means for transmitting a desired signal, and means for transmitting a nuisance signal in all directions except in a predetermined beam, said receiving means comprising a circuit tuned to the frequency of said masking signal, means for impressing the received signals on said tuned circuit, and means associated with said tuned circuit for apprizing an operator of the presence of the masking signal and consequently of the fact that said transmitting means is operating but is not directing a signal toward said receiving means, said last mentioned means comprising a unilateral device and a resistance, means for impressing a voltage corresponding to said masking signal across said unilateral device and said resistance in series, and indicating means connected across said resistance.

6. In a radio communication system comprising transmitting means comprising a pair of antennas operating on substantially the same carrier frequency, means for transmitting a desired signal and means for transmitting a nuisance signal in all directions except along a predetermined line, receiving means comprising a first circuit tuned to the frequency of said nuisance signal, a second circuit tuned to the modulation frequency of said signal, said second circuit being tuned to the modulation frequency of the desired signal, means for impressing the received signals on said tuned circuits, means associated with said first circuit for preventing operation of said second circuit when a nuisance signal is being received, said last mentioned means including a rectifying device having an anode, a cathode, and a resistance one end of which is connected to said cathode and means for impressing the output of said first tuned circuit across said rectifier and said resistance, said second tuned circuit including a discharge device having an anode, a cathode and a control electrode, and means for impressing the potential of the other end of said resistance to said control electrode in order to render inoperative said discharge device in the presence of the nuisance signal.

7. A radio communication system comprising receiving means including a receiving antenna and transmitting means, said transmitting means comprising a pair of antennas operating on substantially the same carrier frequency, a source of high radio frequency carrier waves, means for modulating said carrier waves with a desired signal, means for supplying said modulated carrier to both of said antennas in an in-phase relationship, and means for rendering said antennas alternately operative at a nuisance signal rate.

8. In a communication system, a pair of parallel vertical antennas spaced apart one quarter wave, a source of desired signal, means for energizing alternately said antennas with said desired signal whereby the energized antenna act as a radiator and the unenergized antenna acts as a reflector for said signal so that energy is radiated alternately in oppositely directed cardioid patterns whereby substantially all of said signal is received along the line normal to the plane of said antennas but in all other directions only spaced apart portions of said signal are received.

9. In a system of communication, transmitting means and receiving means, said transmitting means comprising a pair of antennas one of which is of a type to radiate energy substantially equally in all directions, the other of said antennas being of a type which radiates substantially no energy along a predetermined line but radiates energy in all other directions, a source of high frequency oscillations, means for alternately impressing said oscillations on said antennas, means for modulating said high frequency oscillations with one frequency when energy is being supplied to said one of said antennas and with another frequency when said oscillations are being supplied to the other of said antennas, said receiving means comprising a first circuit tuned to said one frequency, a second circuit tuned to said other frequency, and means utilizing said second circuit to prevent the operation of said first circuit whereby said second circuit is operative only when located substantially on said predetermined line.

ROBERT B. DOME.

REFERENCES CITED

The following references are of record in the file of this patent:

UNITED STATES PATENTS

| Number | Name | Date |
|---|---|---|
| 2,212,238 | Kolster | Aug. 20, 1940 |
| 2,279,031 | Cockerell et al. | Apr. 7, 1942 |
| 2,283,897 | Alford | May 26, 1942 |
| 2,320,521 | Kear | June 1, 1943 |

FOREIGN PATENTS

| Number | Country | Date |
|---|---|---|
| 816,345 | France | Aug. 5, 1937 |